United States Patent [19]
Wroclawski

[11] Patent Number: 4,787,167
[45] Date of Patent: Nov. 29, 1988

[54] APPARATUS FOR ARTIFICIAL FISHING LURES HAVING VARIABLE CHARACTERISTICS

[76] Inventor: Michel T. Wroclawski, 12 Carter Rd., East Brunswick, N.J. 08816

[21] Appl. No.: 945,496

[22] Filed: Dec. 23, 1986

[51] Int. Cl.⁴ .............................................. A01K 75/02
[52] U.S. Cl. ...................................................... 43/17.6
[58] Field of Search ................. 43/17.6, 42.32, 42, 43/42.33; 350/351

[56] References Cited

U.S. PATENT DOCUMENTS

| | | | |
|---|---|---|---|
| 3,305,964 | 2/1967 | Wieszeck | 43/42.32 |
| 3,898,354 | 8/1975 | Parker | 350/351 |
| 4,227,331 | 10/1980 | Ursrey | 43/17.6 |
| 4,347,681 | 9/1982 | Fima | 43/17.6 |
| 4,625,447 | 12/1986 | Buchanan | 43/42 |
| 4,676,020 | 6/1987 | Taylor et al. | 43/42.33 |

FOREIGN PATENT DOCUMENTS 1119643 10/1984 U.S.S.R. ................................. 43/42

Primary Examiner—Kurt Rowan
Attorney, Agent, or Firm—Peter L. Michaelson

[57] ABSTRACT

Apparatus is disclosed for an artificial fishing lure and, more particularly, to such a lure in which various characteristics of the lure, such as color, operating depth and/or scent, can be varied by a user.

4 Claims, 2 Drawing Sheets

APPARATUS FOR ARTIFICIAL FISHING LURES HAVING VARIABLE CHARACTERISTICS

TECHNICAL FIELD OF THE INVENTION

The present invention relates to artificial fishing lures and, more particularly, to such a fishing lure in which various characteristics of the lure, such as color, operating depth and/or scent, can be varied by a user.

BACKGROUND OF THE INVENTION

Fisherman have long used artificial lures in lieu of natural bait to catch fish. Inasmuch as fish prey on various kinds of animals of different shapes, colors, sizes which exist at different depths depending on the location, season, vegetation, type of water and the like, an avid fisherman has a tackle box replete with many different artificial lures.

Inasmuch as the color of an artificial lure should closely match that of the prey which the fish feeds on at that time, the color of such a lure often makes the difference between getting a "hit" on a line, i.e. catching a fish, or not.

Alternatively, under other fishing conditions or when fishing for certain species, a fisherman will desire to use a lure that maintains a certain operating depth, e.g. a lure that moves at or near the water surface or a deep diving lure.

Consequently, since fisherman expect to encounter a variety of different fishing conditions, they often purchase a different lure for each different fishing condition. By doing so, they expect to have a lure which they believe is optimally suited to each different fishing condition.

While artificial lures have provided good fishing results and countless hours of enjoyment for the avid fisherman, the expense of purchasing a myriad of different fishing lures can be substantial. Moreover, increasingly large tackle boxes are needed to house and transport an increasingly large number of different lures. Since fisherman typically carry these boxes by hand, the task of carrying increasingly large and heavy tackle boxes becomes quite burdensome particularly if the fisherman needs to walk a substantial distance to his fishing location.

In addition, certain fish are attracted to prey that possess a particular scent over those that have another scent. The particular attractant scent often varies from one species to another; while still other species are not attracted by scent at all. Therefore, a fisherman frequently applies a scented liquid, such as a scented oil, over the surface of a lure in order to attract a certain species of fish. However, this liquid rapidly washes of the surface of the lure by the action of the lure being dragged through the water thereby quickly dissipating the scent of the lure and sharply reducing its attractant power.

Hence, a need exists in the art for a fishing lure that possesses one or more variable characteristics, such as color, operating depth and/or scent, and therefore could be used to advantageously reduce the number of different lures typically purchased to fish for the different species under varying fishing conditions. Moreover, once this lure is scented, this lure should also will maintain its scent throughout a relatively long period of underwater use.

SUMMARY OF THE INVENTION

Therefore, it is an object of the present invention to provide a fishing lure that has one or more variable characteristics.

A specific object is to provide such a lure in which its color, operating depth and/or scent can be varied.

Another object is to provide such a lure that will retain its scent throughout a relatively long period of underwater use.

These and other objects are achieved in accordance with the teachings of the present invention by a fishing lure in which the color, operating depth and/or scent of the lure can be varied by a user. In various embodiments of the present invention, the color of the lure will change in response to the temperature of the water or by selectively varying the flow of current from an energy source located within the lure. This is accomplished, in the disclosed embodiments, by applying a liquid crystal film, which changes its color in response to temperature, to the surface of the lure. Inasmuch the color of the liquid crystal film can also be varied by a current applied therethrough, the color can be changed electrically. Alternatively then, a battery and a potentiometer both located within the lure, but with the latter being adjustable from the surface of the lure, can used to change the color of the liquid crystals. As shown in further embodiments of the invention, the electric current could also be obtained from a photovoltaic cell (solar cell) located within the lure but flush mounted with the surface of the lure.

Also, in accordance with the teachings of the invention, the lure could possess a variable operating depth. This is accomplished, in other disclosed embodiments of the present invention, by changing the weight of the lure and/or by adjusting the shape the lure presents to the water.

Furthermore, in accordance with the teachings of the present invention; a lure is provided with a fish attracting scent which can be varied as desired and which is maintained on the surface of the lure throughout a relatively long period of underwater use. In particular and as shown in other embodiments of the present invention, a quantity of scented fish attractant liquid is stored within a cavity (reservoir) located within the lure and is routed to the surface of the lure by a cap having a very small diameter hole through. In this manner, the liquid is drawn through the cap to the surface of the lure by capillary action and is dispersed over a portion of the lure and coats it as the lure swims through the water. Inasmuch as the hole has a very small diameter, only a very small quantity of the liquid is dispensed at any one time and therefore imparts a scent to the lure throughout a relatively long period of underwater use.

BRIEF DESCRIPTION OF THE DRAWING

The teachings of the present invention may be clearly understood by considering the detailed description in conjunction with the accompanying drawing, in which:

FIG. 4 is a partially-exploded, cross sectional view of an embodiment of the inventive fishing lure whose operating depth can be varied; and FIG. 5 is a partially-exploded, cross sectional view of an another embodiment of the inventive fishing lure which can provide a variable and relatively long lasting scent.

To facilitate understanding, identical reference numerals have been used to denote elements common in the figures.

DETAILED DESCRIPTION

Figure 1:
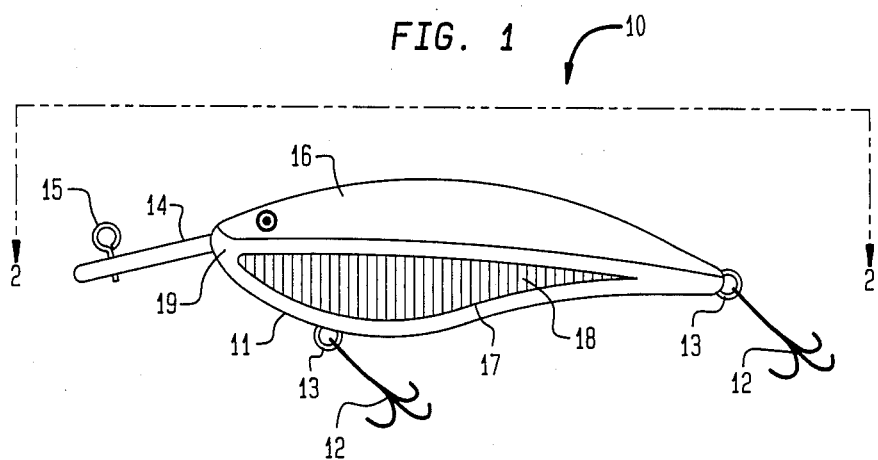
FIG. 1 is a side view of an embodiment of the inventive fishing lure that has a variable color.

As shown in FIG. 1, fishing lure 10 has a body portion 11 having one or more eyelets 13 to which fishing hooks 12 are appended. Body portion 11 also has a protruding fin 14 to which a fishing line or leader is attached via eyelet 15. To provide variable color, a film of liquid crystal 17 is glued onto opposite lower regions 18 (one of which is shown) of body portion 11. Film 17 is then preferably covered with a clear plastic or varnish coating. The upper regions 16 (one of which is shown) of body portion 11 is dark colored and the other areas 19 of body portion 11 are a white-silver color. As the temperature of the water changes, the temperature of the lure tracks these changes as does the color of the liquid crystal thereby enhancing the fish attracting capability of the lure.

Figure 2:
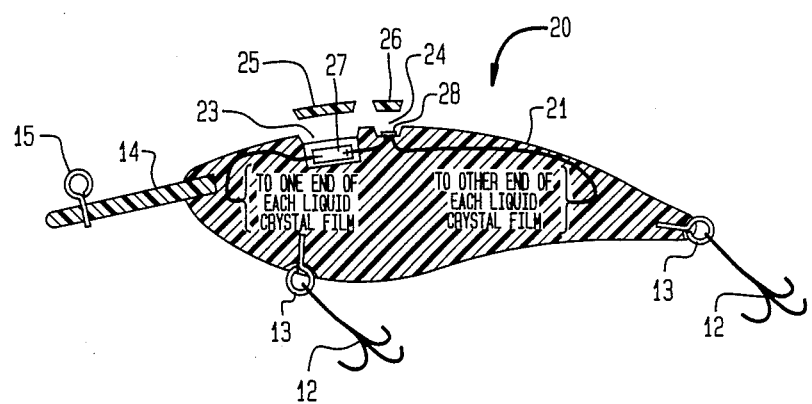
FIGS. 2 and 3 are each a cross sectional view of other embodiments of the inventive fishing lure which provides variable color and are taken along lines 2—2 shown in FIG. 1.

FIG. 2 shows a lure 20 which also incorporates the above-described liquid crystal film (not shown) on selected areas of body portion 21. Portion 21 also incorporates eyelets 13 and 15, hooks 12 and protruding fin 14. Lure 20 is also provided with cavities 23 and 24 for respectively housing a battery 27 and variable resistor 28. Cavities 23 and 24 are provided with a water-tight seal via covers 25 and 26. Extending from the positive and negative terminals of battery 27 are a pair of wires each of which connect to a different end of each liquid crystal film. Variable resistor (potentiometer) 28 is serially disposed in one of the wire paths connected to each of the liquid crystal films so as to adjust the current flow from the battery. Cover 26 can be removed by the fisherman to gain access to the armature of the potentiometer and hence vary the color produced by the liquid crystal film. Alternatively, a hole can be provided through this cover, along with appropriate water tight seals, to permit the fisherman to obtain ready access to the adjustment without removing the cover. This arrangement advantageously provides for a change in the color of the lure regardless of the external water temperature.

Figure 3:
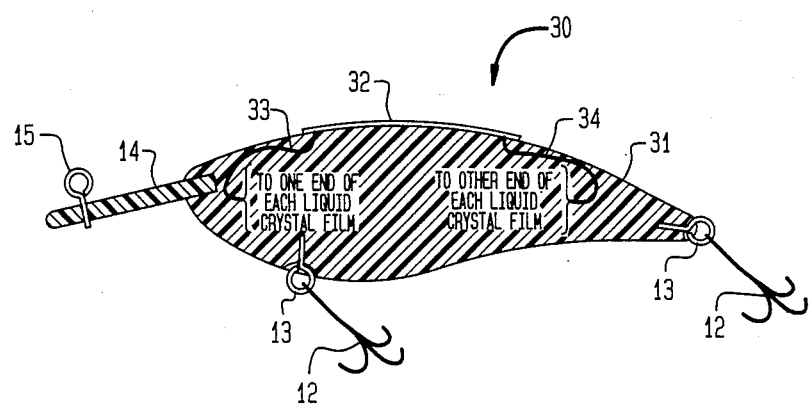

Another color changeable lure which incorporates a film of liquid crystal is shown in FIG. 3. Here, as shown, lure 30 also includes a body portion 31 having one or more eyelets 13 and attached fish hooks 12, protruding fin 14 and line attaching eyelet 15. Lure 30 also includes a photovoltaic cell (solar cell) 32 which is disposed within the lure and flush mounted with an external surface of body portion 31. For purposes of illustration, the thickness of the solar cell has been exaggerated. Cell 32 is connected to each area of liquid crystal film via wires 33 and 34. As with lure 20, the amount of current flowing though the film of liquid crystal determines the color of the liquid crystal film and hence of the lure. This embodiment, which is most advantageous for use in a surface lure, provides color changes independently of water temperature and eliminates the bulk of a battery and expense of periodically changing or charging the same.

Refer now to FIG. 4. This figure is a partially-exploded, cross sectional view of an embodiment of the inventive fishing lure whose operating depth can be varied. As shown here, lure 40 includes a body portion 41 having a slot 47 designed to slidingly receive plate 48. Plate 48 has a plurality of threaded holes 46 extending completely therethrough and an eyelet 15 for accepting a fishing line or leader. When plate 48 is inserted into slot 47, it is retained in position by a screw 60 which is inserted into channel 49 in body portion 41. Screw 60 engages with one of the threaded holes 46, and the hole so engaged determines the amount by which plate 48 extends from body portion 41. Accordingly, plate 48 provides a variable length fin which as is the case for fin 14 in the preceding embodiments, determines the angle at which the lure will dive into the water and hence determine the depth at which the lure operates. Body portion 41 also incorporates a fluid retaining cavity 45 having two extending passageways 43. Passageways 43 extend to the surface of body portion 41 and serve as fluid filling and emptying conduits. To vary the weight of the lure and, hence, its operating depth, cavity 45 can be filled as desired with an appropriate fluid or with appropriate weights. Caps 44 cover passageways 43 and provide fluid-tight seals.

Lure 50 of FIG. 5 is designed to impart a variable and relatively long lasting scent to the lure. As illustrated here, lure 50 includes a body portion 51 having cavity (reservoir) 52 for holding a liquid possessing a fish attracting scent. Cavity 52 is filled via opening 53 which is covered by cap 54. Cap 54 has a small diameter hole (orifice) 55 which extends completely therethrough to the surface of the lure. As lure 50 moves through the water, capillary action draws small amounts of the liquid in cavity 52 into the water surrounding the lure. As the lure moves through the water, the attractant liquid is dispersed into the surrounding water and thereby coats a rear portion of the lure. Since a very small amount of liquid is dispensed through cap 54, at any one time and cavity 52 stores a large amount of the liquid compared to that being dispensed, the liquid will be dispensed and coat the lure throughout a relatively long period of underwater use. In addition, lure 50 incorporates the adjustable fin provided in lure 40 of FIG. 4 and also includes eyelets 13 for securing fish hooks 12 to body portion 51.

Clearly those skilled in the art will recognize that the variable colored lure of FIGS. 1, 2, or 3 can be combined with any of the other embodiments taken singularly or in combination so as to yield an artificial lure having more than one variable characteristic. Or, the embodiments of FIGS. 1, 2, and 3 can be combined to provide a color variable lure which changes color in response to water temperature and in response to the amount of a current from a power source. This power source may be a battery, a solar cell or both in combination. In the last case, the solar cell could be used to recharge the battery. Finally, the variable length fin which affects the operating depth of the lure can be used alone or in combination with cavity 45 of FIG. 4 and either of these arrangements can be combined with the embodiment of FIG. 5.

Although several different embodiments have been shown and described herein, these merely illustrate the teachings of the present invention. Many other embodiments having numerous variations from those shown herein but still incorporating the teachings of the present invention may be devised by those skilled in the art.

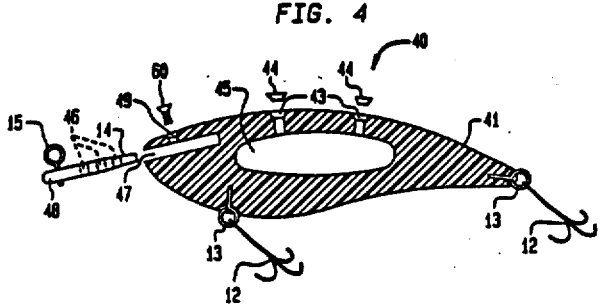

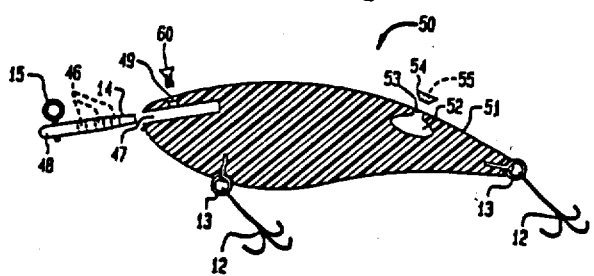

I claim:

1. An artificial fishing lure comprising:
   a body portion;

at least one fishing hook attached to said body portion; and a liquid crystal material disposed on a surface of said body portion, wherein said liquid crystal material changes color in response to a variation in temperature of said liquid crystal material or a variation in electrical current flowing through said liquid crystal material.

2. The lure of claim 1 further comprising a photovoltaic cell disposed on said lure and mounted substantially flush with a surface of said lure, wherein said cell is connected to said liquid crystal material for supplying said electrical current thereto.

3. The lure of claim 1 further comprising a battery disposed in a cavity formed in said body portion, wherein said battery is connected to said liquid crystal material for supplying a said electrical current thereto.

4. The lure of claim 3 further comprising a potentiometer, disposed in a cavity formed in said body portion and connected in series between said battery and said liquid crystal material, for varying the electrical current supplied to said liquid crystal material.

* * * * *

UNITED STATES PATENT AND TRADEMARK OFFICE
CERTIFICATE OF CORRECTION

PATENT NO. : 4,787,167

DATED : November 29, 1988

INVENTOR(S) : Michel T. Wroclawski

It is certified that error appears in the above-identified patent and that said Letters Patent is hereby corrected as shown below:

Figures 4 and 5 should be added as shown on the attached sheet.

Signed and Sealed this

Second Day of May, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,787,167

DATED : November 29, 1988

INVENTOR(S) : Michel T. Wroclawski

It is certified that error appears in the above-identified patent and that said Letters Patent is hereby corrected as shown below: